(12) United States Patent
Kleopa et al.

(10) Patent No.: US 11,310,205 B2
(45) Date of Patent: Apr. 19, 2022

(54) DETECTING EVASIVE NETWORK BEHAVIORS USING MACHINE LEARNING

(71) Applicant: Cisco Technology, Inc., San Jose, CA (US)

(72) Inventors: Constantinos Kleopa, Clarksville, MA (US); Michael Joseph Stepanek, Fulton, MD (US); Silviu Dorin Minut, Severna Park, MD (US); Carter Ryan Waxman, Willow Grove, PA (US)

(73) Assignee: Cisco Technology, Inc., San Jose, CA (US)

( * ) Notice: Subject to any disclaimer, the term of this patent is extended or adjusted under 35 U.S.C. 154(b) by 458 days.

(21) Appl. No.: 16/288,628

(22) Filed: Feb. 28, 2019

(65) Prior Publication Data

US 2020/0280536 A1 Sep. 3, 2020

(51) Int. Cl.
| | |
|---|---|
| *H04L 29/06* | (2006.01) |
| *H04L 12/851* | (2013.01) |
| *G06N 20/00* | (2019.01) |
| *H04L 12/24* | (2006.01) |
| *H04L 12/859* | (2013.01) |
| *H04L 47/2441* | (2022.01) |
| *H04L 47/2483* | (2022.01) |
| *H04L 41/16* | (2022.01) |
| *H04L 47/2475* | (2022.01) |

(52) U.S. Cl.
CPC ........... *H04L 63/029* (2013.01); *G06N 20/00* (2019.01); *H04L 41/16* (2013.01); *H04L 47/2441* (2013.01); *H04L 47/2475* (2013.01); *H04L 47/2483* (2013.01); *H04L 63/0245* (2013.01); *H04L 63/0263* (2013.01); *H04L 63/1425* (2013.01); *H04L 63/1458* (2013.01)

(58) Field of Classification Search
CPC .............. H04L 63/029; H04L 63/0263; H04L 63/0245; H04L 47/2441; H04L 47/2483; H04L 63/1458; H04L 63/1425; H04L 41/16; H04L 47/2475; H04L 43/026; H04L 63/145; G06N 20/00
See application file for complete search history.

(56) References Cited

U.S. PATENT DOCUMENTS

| | | | |
|---|---|---|---|
| 10,764,313 B1 * | 9/2020 | Mushtaq | G06N 20/20 |
| 10,880,270 B1 * | 12/2020 | Rigor | H04L 63/0245 |
| 2018/0367550 A1 * | 12/2018 | Musuvathi | H04L 63/1416 |
| 2020/0106806 A1 * | 4/2020 | Gupta | H04L 63/1416 |

* cited by examiner

*Primary Examiner* — Mohammad W Reza
(74) *Attorney, Agent, or Firm* — Behmke Innovation Group; Kenneth J. Heywood; James J. Wong

(57) ABSTRACT

In one embodiment, a traffic analysis service identifies a client in a network having an associated traffic flow that was blocked by a firewall. The traffic analysis service obtains traffic telemetry data regarding one or more subsequent traffic flows associated with the identified client that are subsequent to the blocked flow. The traffic analysis service uses a machine learning-based classifier to determine that the identified client is exhibiting evasive network behavior, based on the obtained traffic telemetry data. The traffic analysis service initiates a mitigation action in the network, based on the determination that the identified client is exhibiting evasive network behavior.

20 Claims, 7 Drawing Sheets

DETECTING EVASIVE NETWORK BEHAVIORS USING MACHINE LEARNING

TECHNICAL FIELD

The present disclosure relates generally to computer networks, and, more particularly, to detecting evasive network behaviors using machine learning.

BACKGROUND

Enterprise networks are carrying a very fast growing volume of both business and non-business critical traffic. Often, business applications such as video collaboration, cloud applications, etc., use the same hypertext transfer protocol (HTTP) and/or HTTP secure (HTTPS) techniques that are used by non-business critical web traffic. This complicates the task of optimizing network performance for specific applications, as many applications use the same protocols, thus making it difficult to distinguish and select traffic flows for optimization.

Beyond the various types of legitimate application traffic in a network, some network traffic may also be malicious. For example, some traffic may seek to overwhelm a service by sending a large number of requests to the service. Such attacks are also sometimes known as denial of service (DoS) attacks. Other forms of malicious traffic may seek to exfiltrate sensitive information from a network, such as credit card numbers, trade secrets, and the like. Typically, such traffic is generated by a client that has been infected with malware. Thus, further types of malicious network traffic include network traffic that propagate the malware itself and network traffic that passes control commands to already infected devices.

To avoid detection by firewalls and other network security devices, many forms of malware today now intermix legitimate network traffic with malicious network traffic. In addition, even if the malicious traffic is detected and blocked, some malware will continue to try to evade detection by changing the characteristics of its traffic.

BRIEF DESCRIPTION OF THE DRAWINGS

The embodiments herein may be better understood by referring to the following description in conjunction with the accompanying drawings in which like reference numerals indicate identically or functionally similar elements, of which.

DESCRIPTION OF EXAMPLE EMBODIMENTS

Overview

Figure 1A:
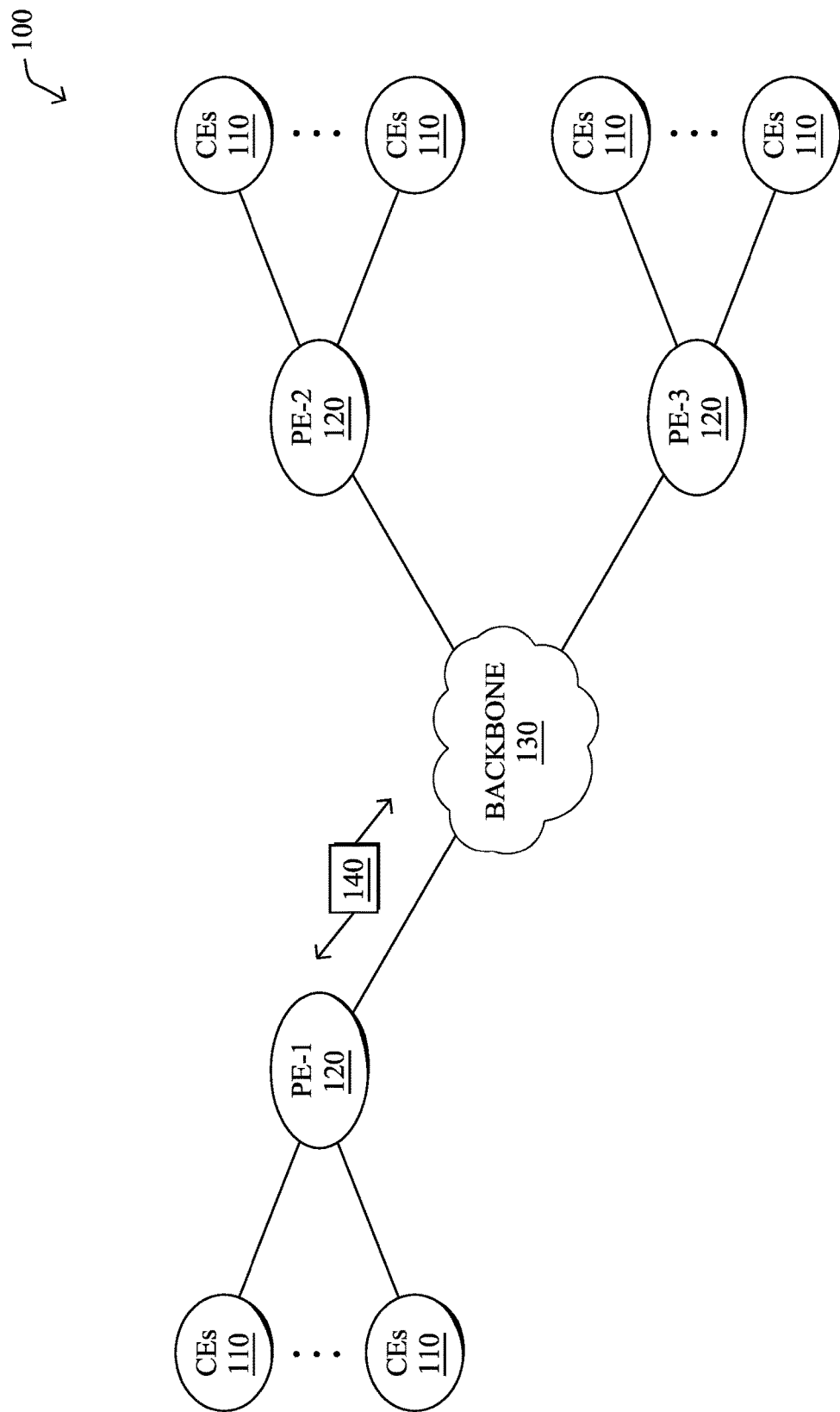
FIGS. 1A-1B illustrate an example communication network.

According to one or more embodiments of the disclosure, a traffic analysis service identifies a client in a network having an associated traffic flow that was blocked by a firewall. The traffic analysis service obtains traffic telemetry data regarding one or more subsequent traffic flows associated with the identified client that are subsequent to the blocked flow. The traffic analysis service uses a machine learning-based classifier to determine that the identified client is exhibiting evasive network behavior, based on the obtained traffic telemetry data. The traffic analysis service initiates a mitigation action in the network, based on the determination that the identified client is exhibiting evasive network behavior.

Description

A computer network is a geographically distributed collection of nodes interconnected by communication links and segments for transporting data between end nodes, such as personal computers and workstations, or other devices, such as sensors, etc. Many types of networks are available, with the types ranging from local area networks (LANs) to wide area networks (WANs). LANs typically connect the nodes over dedicated private communications links located in the same general physical location, such as a building or campus. WANs, on the other hand, typically connect geographically dispersed nodes over long-distance communications links, such as common carrier telephone lines, optical lightpaths, synchronous optical networks (SONET), or synchronous digital hierarchy (SDH) links, or Powerline Communications (PLC) such as IEEE 61334, IEEE P1901.2, and others. The Internet is an example of a WAN that connects disparate networks throughout the world, providing global communication between nodes on various networks. The nodes typically communicate over the network by exchanging discrete frames or packets of data according to predefined protocols, such as the Transmission Control Protocol/Internet Protocol (TCP/IP). In this context, a protocol consists of a set of rules defining how the nodes interact with each other. Computer networks may further be interconnected by an intermediate network node, such as a router, to extend the effective "size" of each network.

Smart object networks, such as sensor networks, in particular, are a specific type of network having spatially distributed autonomous devices such as sensors, actuators, etc., that cooperatively monitor physical or environmental conditions at different locations, such as, e.g., energy/power consumption, resource consumption (e.g., water/gas/etc. for advanced metering infrastructure or "AMI" applications) temperature, pressure, vibration, sound, radiation, motion, pollutants, etc. Other types of smart objects include actuators, e.g., responsible for turning on/off an engine or perform any other actions. Sensor networks, a type of smart object network, are typically shared-media networks, such as wireless networks. That is, in addition to one or more sensors, each sensor device (node) in a sensor network may generally be equipped with a radio transceiver or other communication port, a microcontroller, and an energy source, such as a battery. Often, smart object networks are considered field area networks (FANs), neighborhood area networks (NANs), personal area networks (PANs), etc. Generally, size and cost constraints on smart object nodes (e.g., sensors) result in corresponding constraints on resources such as energy, memory, computational speed and bandwidth.

FIG. 1A is a schematic block diagram of an example computer network 100 illustratively comprising nodes/devices, such as a plurality of routers/devices interconnected by links or networks, as shown. For example, customer edge (CE) routers 110 may be interconnected with provider edge (PE) routers 120 (e.g., PE-1, PE-2, and PE-3) in order to communicate across a core network, such as an illustrative network backbone 130. For example, routers 110, 120 may be interconnected by the public Internet, a multiprotocol label switching (MPLS) virtual private network (VPN), or the like. Data packets 140 (e.g., traffic/messages) may be exchanged among the nodes/devices of the computer network 100 over links using predefined network communication protocols such as the Transmission Control Protocol/Internet Protocol (TCP/IP), User Datagram Protocol (UDP), Asynchronous Transfer Mode (ATM) protocol, Frame Relay protocol, or any other suitable protocol. Those skilled in the art will understand that any number of nodes, devices, links, etc. may be used in the computer network, and that the view shown herein is for simplicity.

In some implementations, a router or a set of routers may be connected to a private network (e.g., dedicated leased lines, an optical network, etc.) or a virtual private network (VPN), such as an MPLS VPN, thanks to a carrier network, via one or more links exhibiting very different network and service level agreement characteristics. For the sake of illustration, a given customer site may fall under any of the following categories:

1.) Site Type A: a site connected to the network (e.g., via a private or VPN link) using a single CE router and a single link, with potentially a backup link (e.g., a 3G/4/LTE backup connection). For example, a particular CE router 110 shown in network 100 may support a given customer site, potentially also with a backup link, such as a wireless connection.

2.) Site Type B: a site connected to the network using two MPLS VPN links (e.g., from different service providers), with potentially a backup link (e.g., a 3G/4G/LTE connection). A site of type B may itself be of different types:

2a.) Site Type B1: a site connected to the network using two MPLS VPN links (e.g., from different service providers), with potentially a backup link (e.g., a 3G/4G/LTE connection).

2b.) Site Type B2: a site connected to the network using one MPLS VPN link and one link connected to the public Internet, with potentially a backup link (e.g., a 3G/4G/LTE connection). For example, a particular customer site may be connected to network 100 via PE-3 and via a separate Internet connection, potentially also with a wireless backup link.

2c.) Site Type B3: a site connected to the network using two links connected to the public Internet, with potentially a backup link (e.g., a 3G/4G/LTE connection).

Notably, MPLS VPN links are usually tied to a committed service level agreement, whereas Internet links may either have no service level agreement at all or a loose service level agreement (e.g., a "Gold Package" Internet service connection that guarantees a certain level of performance to a customer site).

3.) Site Type C: a site of type B (e.g., types B1, B2 or B3) but with more than one CE router (e.g., a first CE router connected to one link while a second CE router is connected to the other link), and potentially a backup link (e.g., a wireless 3G/4G/LTE backup link). For example, a particular customer site may include a first CE router 110 connected to PE-2 and a second CE router 110 connected to PE-3.

Figure 1B:
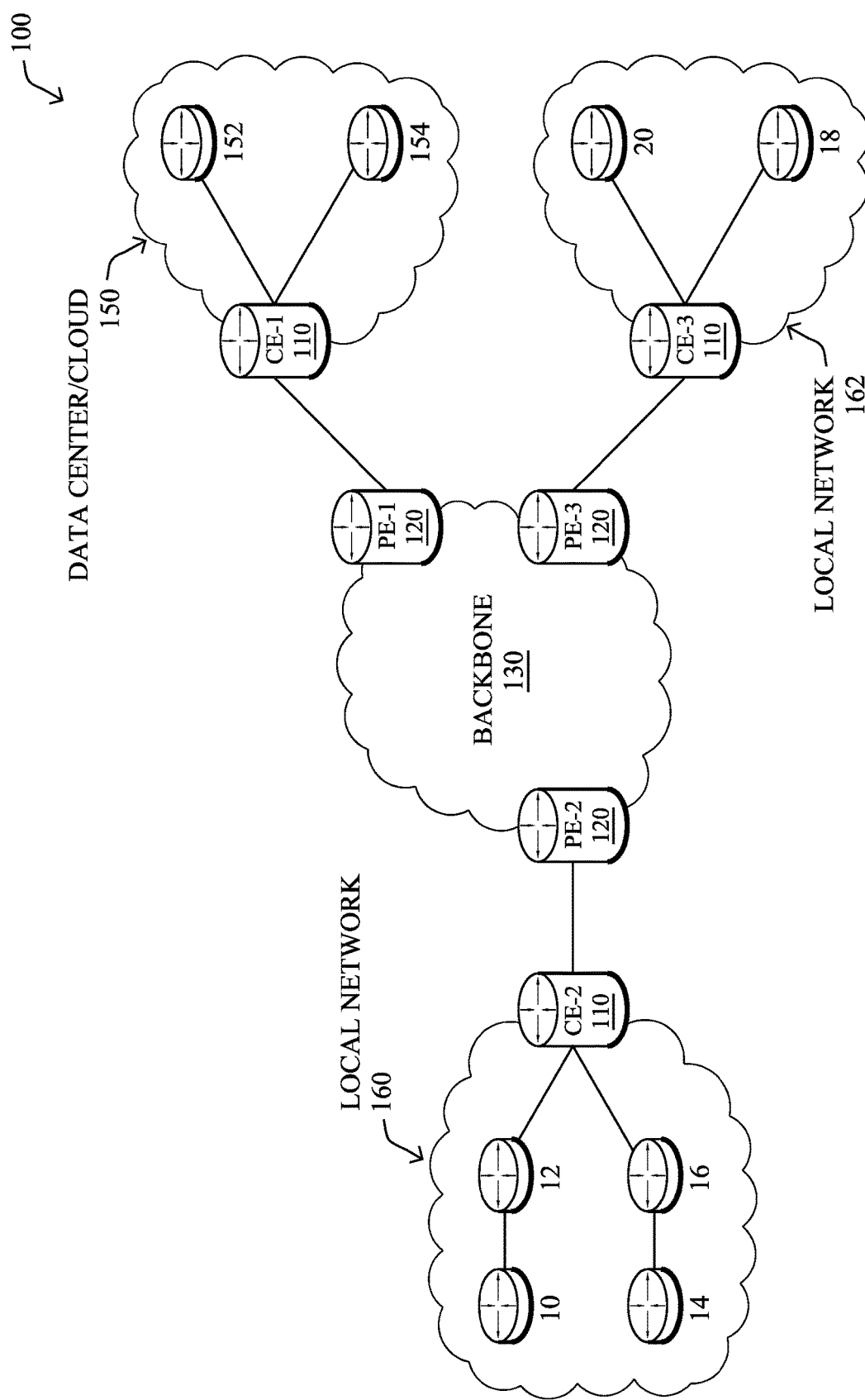

FIG. 1B illustrates an example of network 100 in greater detail, according to various embodiments. As shown, network backbone 130 may provide connectivity between devices located in different geographical areas and/or different types of local networks. For example, network 100 may comprise local networks 160, 162 that include devices/nodes 10-16 and devices/nodes 18-20, respectively, as well as a data center/cloud environment 150 that includes servers 152-154. Notably, local networks 160-162 and data center/cloud environment 150 may be located in different geographic locations.

Servers 152-154 may include, in various embodiments, a network management server (NMS), a dynamic host configuration protocol (DHCP) server, a constrained application protocol (CoAP) server, an outage management system (OMS), an application policy infrastructure controller (APIC), an application server, etc. As would be appreciated, network 100 may include any number of local networks, data centers, cloud environments, devices/nodes, servers, etc.

The techniques herein may also be applied to other network topologies and configurations. For example, the techniques herein may be applied to peering points with high-speed links, data centers, etc. Further, in various embodiments, network 100 may include one or more mesh networks, such as an Internet of Things network. Loosely, the term "Internet of Things" or "IoT" refers to uniquely identifiable objects/things and their virtual representations in a network-based architecture. In particular, the next frontier in the evolution of the Internet is the ability to connect more than just computers and communications devices, but rather the ability to connect "objects" in general, such as lights, appliances, vehicles, heating, ventilating, and air-conditioning (HVAC), windows and window shades and blinds, doors, locks, etc. The "Internet of Things" thus generally refers to the interconnection of objects (e.g., smart objects), such as sensors and actuators, over a computer network (e.g., via IP), which may be the public Internet or a private network.

Notably, shared-media mesh networks, such as wireless networks, etc., are often on what is referred to as Low-Power and Lossy Networks (LLNs), which are a class of network in which both the routers and their interconnect are constrained. In particular, LLN routers typically operate with highly constrained resources, e.g., processing power, memory, and/or energy (battery), and their interconnections are characterized by, illustratively, high loss rates, low data rates, and/or instability. LLNs are comprised of anything from a few dozen to thousands or even millions of LLN routers, and support point-to-point traffic (e.g., between devices inside the LLN), point-to-multipoint traffic (e.g., from a central control point such at the root node to a subset of devices inside the LLN), and multipoint-to-point traffic (e.g., from devices inside the LLN towards a central control point). Often, an IoT network is implemented with an LLN-like architecture. For example, as shown, local network 160 may be an LLN in which CE-2 operates as a root node for nodes/devices 10-16 in the local mesh, in some embodiments.

Figure 2:
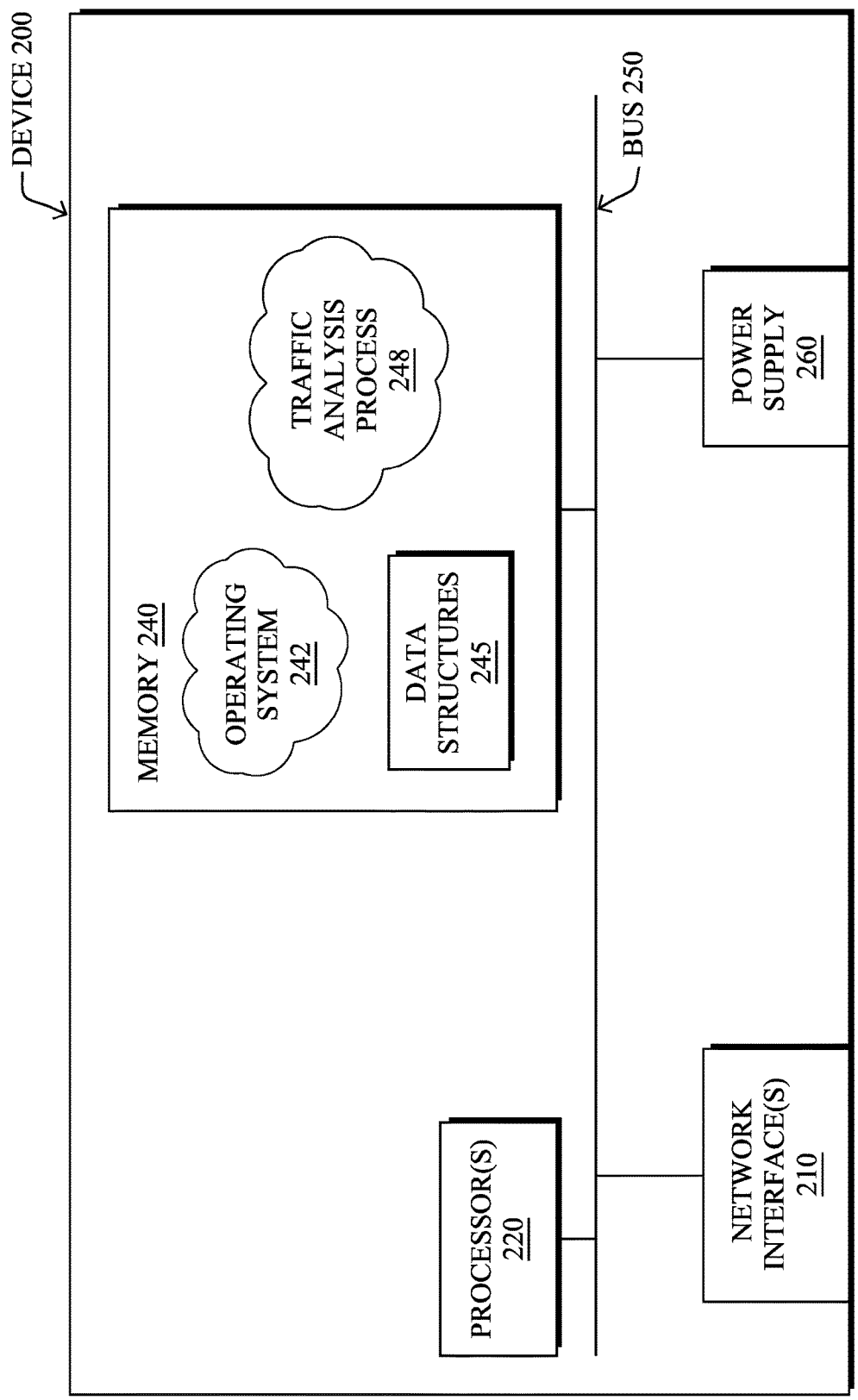
FIG. 2 illustrates an example network device/node.

FIG. 2 is a schematic block diagram of an example node/device 200 that may be used with one or more embodiments described herein, e.g., as any of the computing devices shown in FIGS. 1A-1B, particularly the PE routers 120, CE routers 110, nodes/device 10-20, servers 152-154 (e.g., a network controller located in a data center, etc.), any other computing device that supports the operations of network 100 (e.g., switches, etc.), or any of the other devices referenced below. The device 200 may also be any other suitable type of device depending upon the type of network architecture in place, such as IoT nodes, etc. Device 200 comprises one or more network interfaces 210, one or more processors 220, and a memory 240 interconnected by a system bus 250, and is powered by a power supply 260.

The network interfaces 210 include the mechanical, electrical, and signaling circuitry for communicating data over physical links coupled to the network 100. The network interfaces may be configured to transmit and/or receive data using a variety of different communication protocols. Notably, a physical network interface 210 may also be used to implement one or more virtual network interfaces, such as for virtual private network (VPN) access, known to those skilled in the art.

The memory 240 comprises a plurality of storage locations that are addressable by the processor(s) 220 and the network interfaces 210 for storing software programs and data structures associated with the embodiments described herein. The processor 220 may comprise necessary elements or logic adapted to execute the software programs and manipulate the data structures 245. An operating system 242 (e.g., the Internetworking Operating System, or IOS®, of Cisco Systems, Inc., another operating system, etc.), portions of which are typically resident in memory 240 and executed by the processor(s), functionally organizes the node by, inter alia, invoking network operations in support of software processors and/or services executing on the device. These software processors and/or services may comprise a traffic analysis process 248.

It will be apparent to those skilled in the art that other processor and memory types, including various computer-readable media, may be used to store and execute program instructions pertaining to the techniques described herein. Also, while the description illustrates various processes, it is expressly contemplated that various processes may be embodied as modules configured to operate in accordance with the techniques herein (e.g., according to the functionality of a similar process). Further, while processes may be shown and/or described separately, those skilled in the art will appreciate that processes may be routines or modules within other processes.

In general, traffic analysis process 248 may execute one or more machine learning-based classifiers to classify traffic in the network (and its originating application) for any number of purposes. In one embodiment, traffic analysis process 248 may assess captured telemetry data regarding one or more traffic flows, to determine whether a given traffic flow or set of flows are caused by malware in the network, such as a particular family of malware applications. Example forms of traffic that can be caused by malware may include, but are not limited to, traffic flows reporting exfiltrated data to a remote entity, spyware or ransomware-related flows, command and control (C2) traffic that oversees the operation of the deployed malware, traffic that is part of a network attack, such as a zero day attack or denial of service (DoS) attack, combinations thereof, or the like.

Traffic analysis process 248 may employ any number of machine learning techniques, to classify the gathered telemetry data. In general, machine learning is concerned with the design and the development of techniques that receive empirical data as input (e.g., telemetry data regarding traffic in the network) and recognize complex patterns in the input data. For example, some machine learning techniques use an underlying model M, whose parameters are optimized for minimizing the cost function associated to M, given the input data. For instance, in the context of classification, the model M may be a straight line that separates the data into two classes (e.g., labels) such that $M=a*x+b*y+c$ and the cost function is a function of the number of misclassified points. The learning process then operates by adjusting the parameters a,b,c such that the number of misclassified points is minimal. After this optimization/learning phase, traffic analysis 248 can use the model M to classify new data points, such as information regarding new traffic flows in the network. Often, M is a statistical model, and the cost function is inversely proportional to the likelihood of M, given the input data.

In various embodiments, traffic analysis process 248 may employ one or more supervised, unsupervised, or semi-supervised machine learning models. Generally, supervised learning entails the use of a training set of data, as noted above, that is used to train the model to apply labels to the input data. For example, the training data may include sample telemetry data that is "normal," or "evasive." On the other end of the spectrum are unsupervised techniques that do not require a training set of labels. Notably, while a supervised learning model may look for previously seen attack patterns that have been labeled as such, an unsupervised model may instead look to whether there are sudden changes in the behavior of the network traffic. Semi-supervised learning models take a middle ground approach that uses a greatly reduced set of labeled training data.

Example machine learning techniques that traffic analysis process 248 can employ may include, but are not limited to, nearest neighbor (NN) techniques (e.g., k-NN models, replicator NN models, etc.), statistical techniques (e.g., Bayesian networks, etc.), clustering techniques (e.g., k-means, mean-shift, etc.), neural networks (e.g., reservoir networks, artificial neural networks, etc.), support vector machines (SVMs), logistic or other regression, Markov models or chains, principal component analysis (PCA) (e.g., for linear models), multi-layer perceptron (MLP) ANNs (e.g., for non-linear models), replicating reservoir networks (e.g., for non-linear models, typically for time series), random forest classification, or the like.

The performance of a machine learning model can be evaluated in a number of ways based on the number of true positives, false positives, true negatives, and/or false negatives of the model. For example, the false positives of the model may refer to the number of traffic flows that are incorrectly classified as evasive or malware-generated. Conversely, the false negatives of the model may refer to the number of traffic flows that the model incorrectly classifies as normal, when actually are evasive or malware-generated. True negatives and positives may refer to the number of traffic flows that the model correctly classifies as normal or evasive/malware-generated, respectively. Related to these measurements are the concepts of recall and precision. Generally, recall refers to the ratio of true positives to the sum of true positives and false negatives, which quantifies the sensitivity of the model. Similarly, precision refers to the ratio of true positives the sum of true and false positives.

In some cases, traffic analysis process 248 may assess the captured telemetry data on a per-flow basis. In other embodiments, traffic analysis 248 may assess telemetry data for a plurality of traffic flows based on any number of different conditions. For example, traffic flows may be grouped based on their sources, destinations, temporal characteristics (e.g., flows that occur around the same time, etc.), combinations thereof, or based on any other set of flow characteristics.

Figure 3:
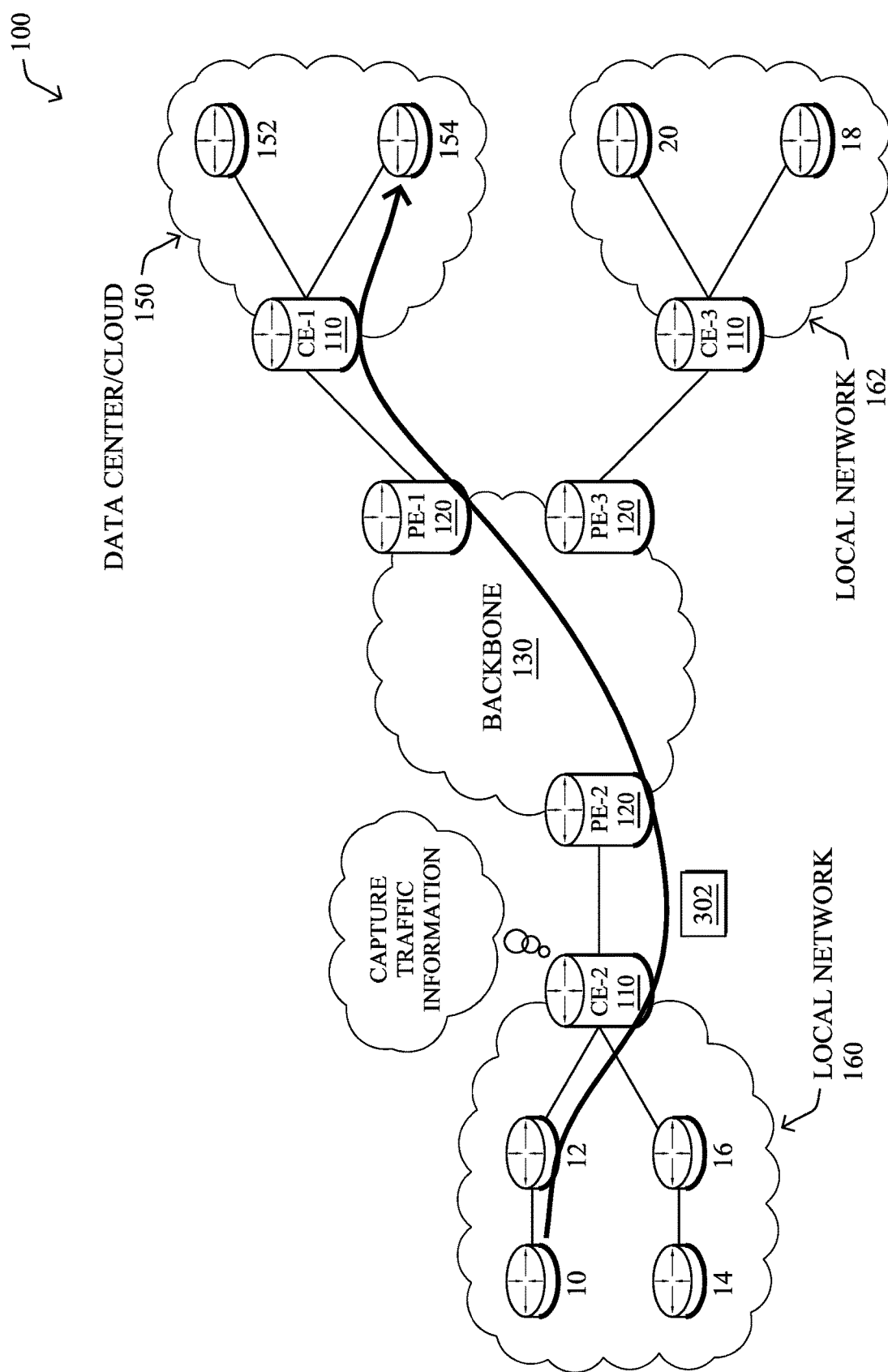
FIG. 3 illustrates an example of a device capturing traffic information.

As shown in FIG. 3, various mechanisms can be leveraged to capture information about traffic in a network, such as telemetry data regarding a traffic flow. For example, consider the case in which client node 10 initiates a traffic flow with remote server 154 that includes any number of packets 302. Any number of networking devices along the path of the flow may analyze and assess packet 302, to capture telemetry data regarding the traffic flow. For example, as shown, consider the case of edge router CE-2 through which the traffic between node 10 and server 154 flows.

In some embodiments, a networking device may analyze packet headers, to capture feature information about the traffic flow. For example, router CE-2 may capture the source address and/or port of host node 10, the destination address and/or port of server 154, the protocol(s) used by packet 302, or other header information by analyzing the header of a packet 302. Example captured features may include, but are not limited to, Transport Layer Security (TLS) information (e.g., from a TLS handshake), such as the ciphersuite offered, user agent, TLS extensions (e.g., type of encryption used, the encryption key exchange mechanism, the encryption authentication type, etc.), HTTP information (e.g., URI, etc.), Domain Name System (DNS) information, or any other data features that can be extracted from the observed traffic flow(s).

In further embodiments, the device may also assess the payload of the packet to capture information about the traffic flow. For example, router CE-2 or another device may perform deep packet inspection (DPI) on one or more of packets 302, to assess the contents of the packet. Doing so may, for example, yield additional information that can be used to determine the application associated with the traffic flow (e.g., packets 302 were sent by a web browser of node 10, packets 302 were sent by a videoconferencing application, etc.). However, as would be appreciated, a traffic flow may also be encrypted, thus preventing the device from assessing the actual payload of the packet. In such cases, the characteristics of the application can instead be inferred from the captured header information.

The networking device that captures the flow telemetry data may also compute any number of statistics or metrics regarding the traffic flow. For example, CE-2 may determine the start time, end time, duration, packet size(s), the distribution of bytes within a flow, etc., associated with the traffic flow by observing packets 302. In further examples, the capturing device may capture sequence of packet lengths and time (SPLT) data regarding the traffic flow, sequence of application lengths and time (SALT) data regarding the traffic flow, or byte distribution (BD) data regarding the traffic flow.

As noted above, modern malware often attempts to evade detection in any number of ways. On the executing client, malware may attempt to evade detection by changing file names, registry entries, or the like, associated with the malware. External to the client, malware may also exhibit a number of evasive network behaviors, in an attempt to evade detection by a firewall. Notably, in the case of C2 and other malware-associated traffic, even if the firewall is able to block one connection between the infected client and the control server, the malware may continue to attempt to contact the server by changing the characteristics of its traffic, as detailed below.

Detecting Evasive Network Behaviors Using Machine Learning

The techniques herein introduce a method for detecting applications that exhibit evasive network behaviors. In some aspects, a machine learning-based classifier can be trained to detect network behaviors that are attempting to evade blocking by a firewall. Once detected, any number of mitigation actions can be taken in the network.

Specifically, according to one or more embodiments of the disclosure as described in detail below, a traffic analysis service identifies a client in a network having an associated traffic flow that was blocked by a firewall. The traffic analysis service obtains traffic telemetry data regarding one or more subsequent traffic flows associated with the identified client that are subsequent to the blocked flow. The traffic analysis service uses a machine learning-based classifier to determine that the identified client is exhibiting evasive network behavior, based on the obtained traffic telemetry data. The traffic analysis service initiates a mitigation action in the network, based on the determination that the identified client is exhibiting evasive network behavior.

Illustratively, the techniques described herein may be performed by hardware, software, and/or firmware, such as in accordance with the traffic analysis process 248, which may include computer executable instructions executed by the processor 220 (or independent processor of interfaces 210) to perform functions relating to the techniques described herein.

Figure 4A:
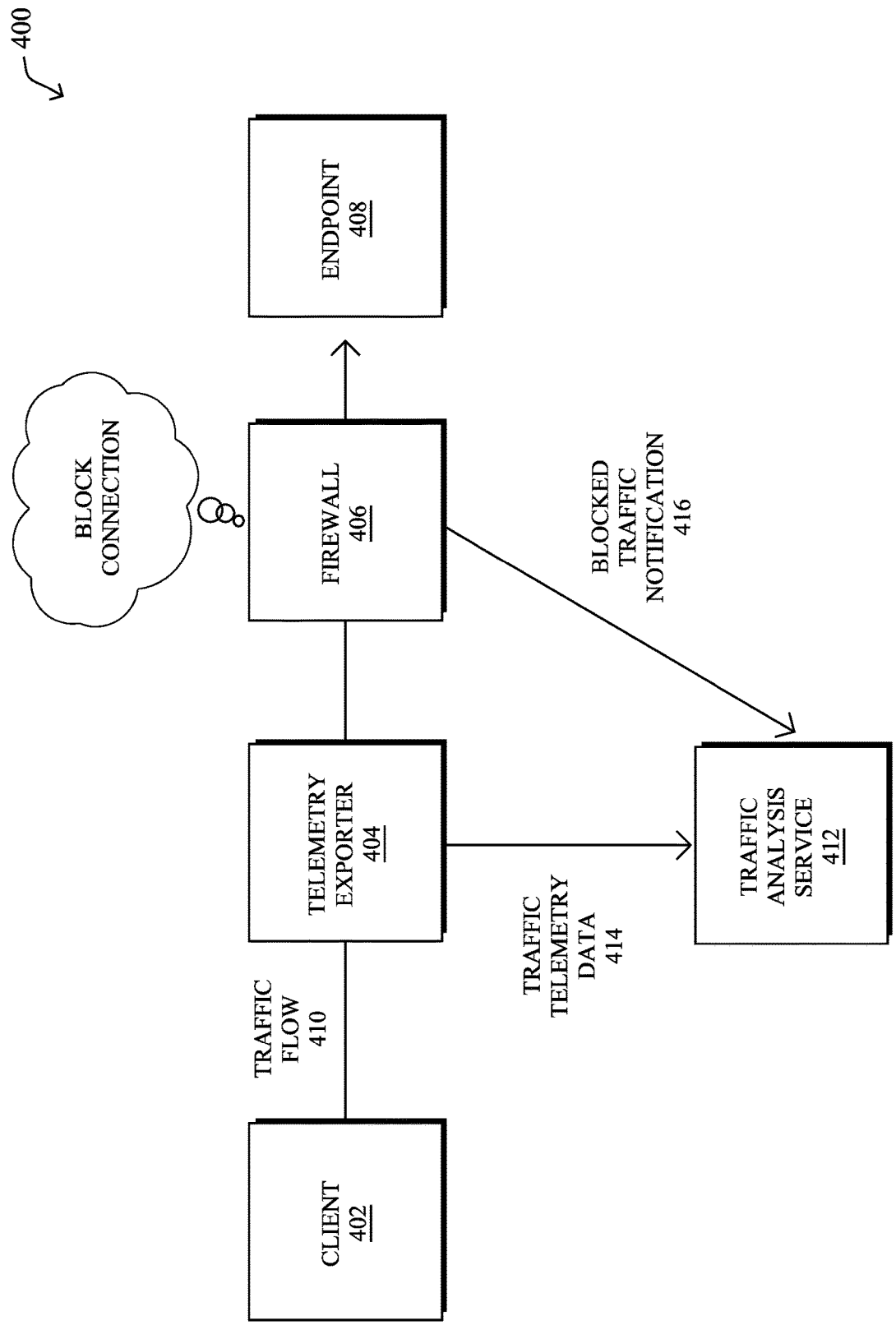
FIGS. 4A-4B illustrate an example architecture for detecting evasive network traffic behavior.
Figure 4B:
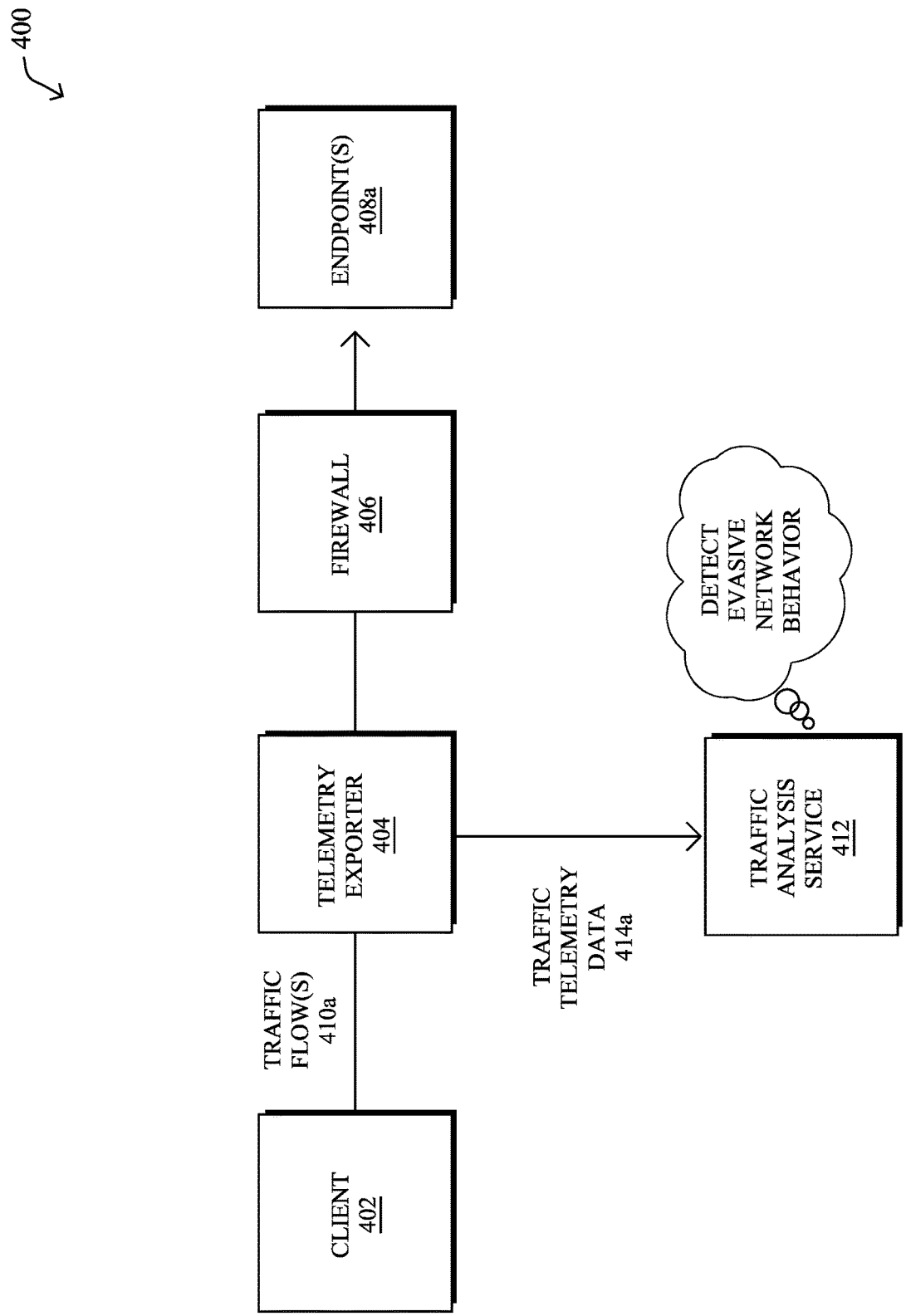

Operationally, FIGS. 4A-4B illustrate an example architecture for detecting evasive network traffic behavior, according to various embodiments. As shown in FIG. 4A, assume that a network 400 includes a client 402 in the local network under scrutiny that communicates with another remote endpoint 408. For example, in many cases, client 402 may be a client device that communicates with a remote server or service via network 400. More specifically, client 402 may form a traffic session with endpoint 408 and send traffic flow 410 towards endpoint 408 via network 400.

Located along the network path between client 402 and endpoint 408 may be any number of telemetry exporters, such as telemetry exporter 404 shown. For example, telemetry exporter 404 may be a switch, router, firewall, server, network controller, or other networking equipment via which traffic flow 410 sent between client 402 and endpoint 408 flows. During operation, traffic telemetry exporter 404 may capture data regarding traffic flow 410, generate traffic telemetry data 414 based on the captured data, and send traffic telemetry data 414 to traffic analysis service 412 for assessment. For example, traffic telemetry data 414 may include Internet Protocol Flow Information Export (IPFIX) records and/or Netflow records regarding traffic flow 410. In further cases, traffic telemetry data 414 may include one or more captured packets from traffic flow 410, such as the first n-number of data packets of flow 410.

In various embodiments, network 400 may also include a firewall 406 configured to block certain traffic from ingressing or egressing the local network of client 402. For example, firewall 406 may be configured to prevent traffic from being sent to certain blacklisted websites or other server addresses. Typically, the blacklist includes websites and other endpoints that have been flagged as posing a security risk. However, some blacklists also block access to certain categories of websites and other online services. For example, in order to prevent data exfiltration of sensitive information from the local network, a blacklist employed by firewall 406 may block attempts to upload files to a cloud-based file storage service, such as Dropbox. The one or more blacklists employed by firewall 406 may also be updated by a security service, such as via threat intelligence feeds (TI feeds) or the like.

Network 400 may also include a traffic analysis service 412 that is implemented by one or more devices in network 400 through the execution of traffic analysis process 248, described previously. For example, in some cases, traffic analysis service 412 may be implemented by one or more devices in the local network of client 402. However, in further cases, traffic analysis service 412 may be implemented as a cloud service that is in communication with telemetry exporter 404 and client 402, either directly or indirectly. Further, while telemetry exporter 404, firewall 406, and traffic analysis service 412 are shown as separate entities, any or all of these services may be implemented on the same device, as desired.

Assume for purposes of illustration that client 402 sends traffic flow 410 towards endpoint 408, but that firewall 406 blocks the traffic from reaching endpoint 408. In some embodiments, firewall 406 may notify traffic analysis service 412 that traffic flow 410 of client 402 has been blocked. For example, blocked traffic notification 416 may indicate any or all of the following to traffic analysis service 412:

- The identity of client 402 that originated traffic flow 410
- Timing information, such as when firewall 406 blocked traffic flow 410
- Source and/or destination information, such as the address of endpoint 408, and the like.
- Rule information that indicates why traffic flow 410 was blocked. For example, notification 416 may indicate whether firewall 406 blocked traffic flow 410 for a security-related reason or for another policy reason.

After receiving blocked traffic notification 416 from firewall 406, traffic analysis service 412 may use the information included in notification 416 to correlate the blocking of traffic flow 410 with traffic telemetry data 414 captured regarding traffic flow 410. In doing so, traffic analysis service 414 now has the baseline characteristics of the blocked traffic flow 410.

While a single blocked flow may itself be indicative of client 402 being infected with malware, it may also be the case that it is an isolated incident. However, in the case of client 402 being infected with malware, some forms of malware will respond to firewall 406 blocking traffic flow 410 by sending communications with a more random behavior, to make it more difficult for firewall 406 to detect.

By way of example of evasive network behaviors consider the two following operating modes for some forms of malware:

Normal Operation Mode

Application A on Client Host IP: 1.1.1.1 connects to server IP 2.2.2.2, or to host name "example.com," with traffic encrypted in MIPS, as soon as it starts, in an effort to share date between the client and server.
This type of behavior is relatively easy to prevent, as firewall 406 need only be configured to block traffic associated with the server IP or host name.

Evasive Operation Mode

Application A on Client IP: 1.1.1.1 attempts to connect to server IP 3.3.3.3 with traffic encrypted in HTTPS. If firewall 406 blocks this traffic, the application may then try another list of hosts or IPs.
After being blocked from accessing server IP 3.3.3.3, application A then attempts to access server IP 4.4.4.4 with Secure Shell (SSH) protocol traffic. In this case, the application has changed both the protocol, as well as the destination, of its traffic, in an effort to bypass firewall 406.
If application A is blocked from accessing server IP 4.4.4.4, it may then send 20 byes of data, or an Internet Control Message Protocol (ICMP) message, somewhere else, to see if that destination is accessible.
Application A may continue this approach until it finds a way to connect to its C2 servers.

To illustrate the teachings herein, consider the example in FIG. 4B. As shown, assume that after firewall 406 has blocked traffic flow 410 from client 402 to endpoint 408 in FIG. 4A, the application on client 402 enters into an evasive operation mode, to avoid detection by firewall 406 and make contact with its C2 server. Accordingly, client 402 may send any number of subsequent traffic flows 410a towards any number of endpoints 408a, which may or may not include endpoint 408 for which traffic flow 410 was blocked from accessing.

Similar to FIG. 4A, telemetry exporter 404 may capture and export telemetry data regarding traffic flow(s) 410a and send the captured traffic telemetry data 414a to traffic analysis service 412 for further analysis. In doing so, traffic analysis service 412 now has knowledge of firewall 406 blocking traffic flow 410 from client 402, as well as the characteristics of the subsequent traffic flows issued by client 402.

According to various embodiments, traffic analysis service 412 may use the captured traffic telemetry data 414a regarding the one or more traffic flow(s) 410a associated with client 402, to determine whether the corresponding application on client 402 is exhibiting evasive network behavior. If so, this is a strong indication that the blocking of traffic flow 410 by firewall 406 was not a random event but is indeed a sign of malware infection on client 402.

In general, the classifier of traffic analysis service 412 may base its classification on changes in the traffic characteristics of traffic associated with client 402. For example, evasive malware on client 402 may change any or all of the following traffic characteristics, to avoid further blocking by firewall 406:

- Destination/server IP, hostname, and/or port—In many cases, a C2 or other malicious server may employ a large bank of IP addresses or hostnames, so that blocking one address or hostname will do little to prevent its controlled malware from making contact.
- Traffic protocols—To further evade detection, the malware may change the network protocol being used (e.g., switching between TCP and UDP) and/or the application layer protocol, such as switching between HTTP, HTTPS, SSH, SSL, Network Time Protocol (NTP), ICMP, DNS, LDAP, DHCP, or the like.
- Protocol fields—Changes to the protocol-specific fields of the traffic can also be a strong indicator of evasive network behavior. For example, changes in the user agent, ciphersuite offered, or the like, can indicate that the malicious application is attempting to avoid detection.
- Timing—The length of time associated with any of the above changes, as well as the amount of time between traffic flows 410, 410a, could also be indicative of evasive network behavior. For example, certain malware may wait a specific amount of time before attempting to connect with its server using traffic with different characteristics.

Using traffic telemetry data 414a and, potentially, the previously obtained traffic telemetry data 414 regarding bloced flow 410, the machine learning-based classifier may determine whether client 402 is exhibiting an evasive network behavior. Such a classifier may take as input, for example, the various traffic characteristics captured by telemetry data 414a and/or 414, and output a label indicative of the type of behavior of the corresponding traffic flows.

Based on the assessment of the network behavior of client 402 by traffic analysis service 412, traffic analysis service 412 may initiate any number of mitigation actions to be performed in network 400. For example, traffic analysis service 412 may block or drop traffic flow(s) 410a, if client

402 is found to be exhibiting evasive behavior. In more extreme cases, traffic analysis service 412 may prevent all future traffic in network 400 associated with client 402 and/or endpoint(s) 408, 408*a*. In yet another example, traffic analysis service 412 may send a notification to a user interface that is indicative of the determination by traffic analysis service 412 that client 402 is exhibiting evasive network behavior. For example, traffic analysis service 412 may notify a network administrator, if client 402 is suspected of being infected with malware, based on the behavior of its traffic.

Training of the machine learning-based classifier of traffic analysis service 412 can be performed either locally on the device hosting traffic analysis service 412 or at another location, such as a sandbox environment, and pushed to traffic analysis service 412 after training. For example, a training dataset can be formed by executing malware in a sandbox environment, blocking some or all of its attempted server connections, and collecting telemetry data regarding the traffic generated by the infected client. This collected telemetry data can then be labeled accordingly, if it is indicative of evasive network behavior. Similarly, telemetry data collected from a live network that is presumed to be malware-free can be labeled as being indicative of normal network behavior, for purposes of training the classifier.

Of course, in further embodiments, unsupervised learning approaches can also be used, such as by modeling the baseline network behaviors of clients presumed to be malware-free and comparing the observed behavior of a client under scrutiny to this formed model. If the behavior of the client deviates from the modeled behavior by a threshold amount, this may be also be indicative of evasive network behavior.

Figure 5:
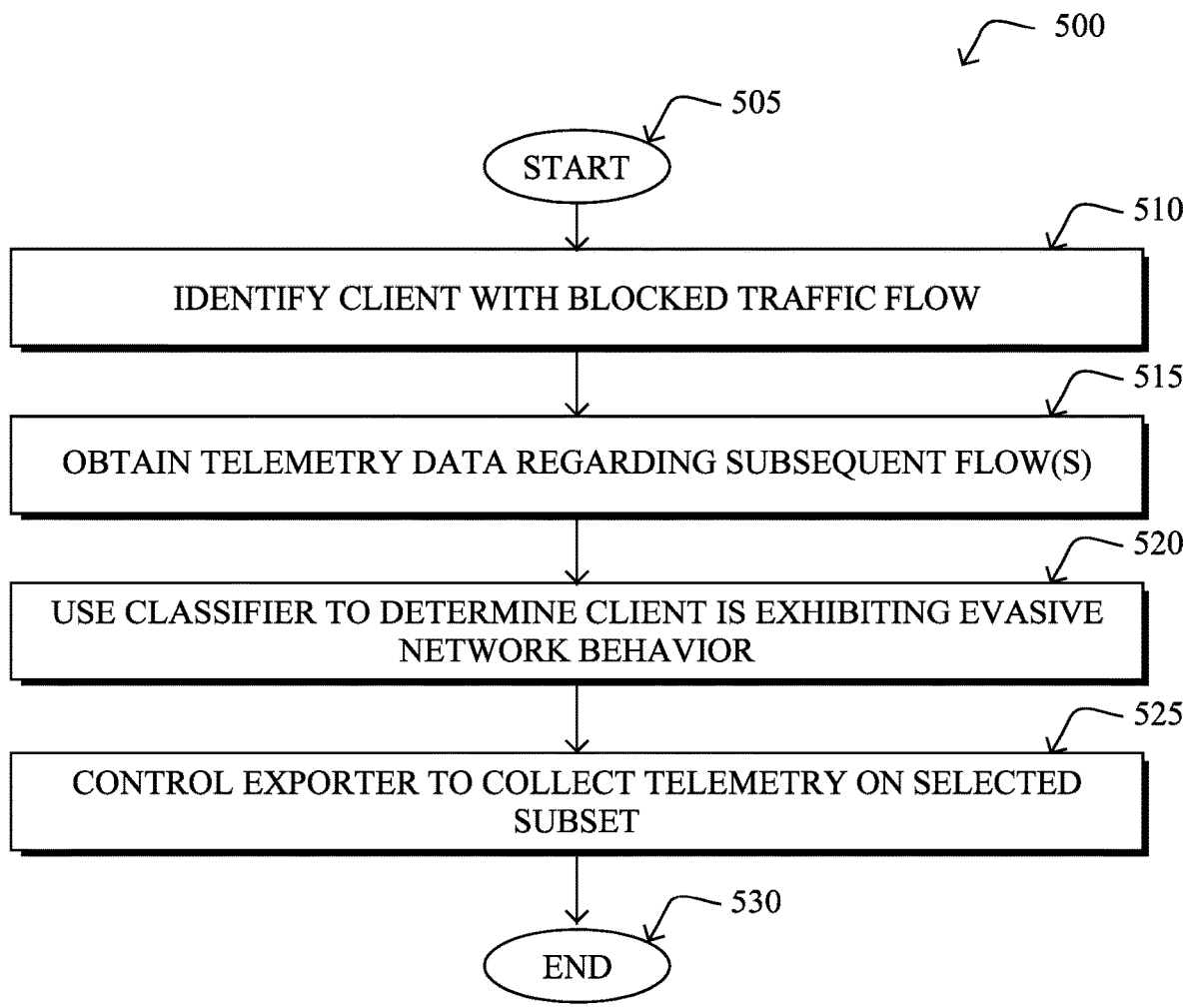
FIG. 5 illustrates an example simplified procedure for detecting evasive network behavior by a client in a network.

FIG. 5 illustrates an example simplified procedure for detecting evasive network behavior by a client, according to various embodiments. For example, a non-generic, specifically configured device (e.g., device 200) may perform procedure 500 by executing stored instructions (e.g., process 248), to provide a traffic analysis service to the network. The procedure 500 may start at step 505, and continues to step 510, the traffic analysis service identifies a client in a network having an associated traffic flow that was blocked by a firewall. For example, the traffic analysis service may receive a notification from the firewall that the traffic flow was blocked. In other embodiments, the traffic analysis service may analyze log data regarding the flow, to identify the client.

At step 515, as detailed above, the traffic analysis service may obtain traffic telemetry data regarding one or more subsequent traffic flows associated with the identified client that are subsequent to the blocked flow. Such traffic telemetry data may indicate, for example, the destination hostname(s), IP address(es), port(s), protocol(s), timing information, or the like, regarding the one or more traffic flows. Notably, the telemetry data may be indicative of a change of destination addresses or ports of the one or more subsequent traffic flows from that of the blocked flow, a change of traffic protocol of the one or more subsequent traffic flows from that of the blocked flow, a time span associated with the change(s), protocol field information, or any other information that can be captured about the flow(s).

At step 520, the traffic analysis service may use a machine learning-based classifier to determine that the identified client is exhibiting evasive network behavior, based on the obtained traffic telemetry data, as described in greater detail above. Notably, the classifier may determine whether the source application on the client is changing its behavior in such a way as to avoid further traffic blocking by the firewall. For example, the classifier can be trained using traffic samples from known malware, to label the subsequent flow(s) of the client, accordingly.

At step 525, as detailed above, the traffic analysis service may initiate a mitigation action in the network, based on the determination that the identified client is exhibiting evasive network behavior. For example, if the client is suspected of being infected with malware that exhibits evasive network behaviors, the service may send an alert regarding the evasive behavior to a user interface, block further traffic associated with the client, or take further corrective measures. Procedure 500 then ends at step 530.

It should be noted that while certain steps within procedure 500 may be optional as described above, the steps shown in FIG. 5 are merely examples for illustration, and certain other steps may be included or excluded as desired. Further, while a particular order of the steps is shown, this ordering is merely illustrative, and any suitable arrangement of the steps may be utilized without departing from the scope of the embodiments herein.

The techniques described herein, therefore, introduce mechanisms that allow for the detection of evasive network behaviors, such as those exhibited by malware. In some aspects, machine learning can be leveraged to learn and detect these evasive behaviors, allowing mitigation actions to be taken.

While there have been shown and described illustrative embodiments that provide for the detection of evasive network behaviors, it is to be understood that various other adaptations and modifications may be made within the spirit and scope of the embodiments herein. For example, while certain embodiments are described herein with respect to using certain models for purposes of traffic analysis, the models are not limited as such and may be used for other functions, in other embodiments. In addition, while certain protocols are shown, such as HTTPS, other suitable protocols may be used, accordingly.

The foregoing description has been directed to specific embodiments. It will be apparent, however, that other variations and modifications may be made to the described embodiments, with the attainment of some or all of their advantages. For instance, it is expressly contemplated that the components and/or elements described herein can be implemented as software being stored on a tangible (non-transitory) computer-readable medium (e.g., disks/CDs/RAM/EEPROM/etc.) having program instructions executing on a computer, hardware, firmware, or a combination thereof. Accordingly, this description is to be taken only by way of example and not to otherwise limit the scope of the embodiments herein. Therefore, it is the object of the appended claims to cover all such variations and modifications as come within the true spirit and scope of the embodiments herein.

What is claimed is:

1. A method comprising:
    identifying, by a traffic analysis service, a client in a network having an associated traffic flow that was blocked by a firewall;
    obtaining, by the traffic analysis service, traffic telemetry data regarding one or more subsequent traffic flows associated with the identified client that are subsequent to the blocked flow;
    using, by the traffic analysis service, a machine learning-based classifier to determine that the identified client is exhibiting evasive network behavior, based on the obtained traffic telemetry data; and initiating, by the traffic analysis service, a mitigation action in the network, based on the determination that the identified client is exhibiting evasive network behavior.

2. The method as in claim 1, wherein the mitigation action comprises one of: blocking network traffic associated with the client or sending an alert regarding the evasive network behavior to a user interface.

3. The method as in claim 1, wherein identifying the client in the network comprises:
receiving a notification from the firewall that the traffic flow associated with the client was blocked by the firewall.

4. The method as in claim 1, wherein the traffic telemetry data is indicative of a change of destination addresses or ports of the one or more subsequent traffic flows from that of the blocked flow.

5. The method as in claim 1, further comprising:
training, by the traffic analysis service, the machine learning-based classifier using a training dataset comprising telemetry data regarding traffic flows generated by malware.

6. The method as in claim 1, wherein the traffic telemetry data is indicative of a change of traffic protocol of the one or more subsequent traffic flows from that of the blocked flow.

7. The method as in claim 6, wherein the traffic telemetry data is further indicative of a time span associated with the change of protocol.

8. The method as in claim 6, wherein the traffic protocol of the one or more subsequent traffic flows is one of: the HyperText Transfer Protocol (HTTP), the HTTP Secure (HTTPS) protocol, the Secure Shell (SSH) protocol, or the Network Time Protocol (NTP).

9. The method as in claim 1, wherein the traffic telemetry data is further indicative of a protocol field used by the one or more subsequent traffic flows.

10. An apparatus, comprising:
one or more network interfaces to communicate with a network;
a processor coupled to the network interfaces and configured to execute one or more processes; and
a memory configured to store a process executable by the processor, the process when executed configured to:
identify a client in a network having an associated traffic flow that was blocked by a firewall;
obtain traffic telemetry data regarding one or more subsequent traffic flows associated with the identified client that are subsequent to the blocked flow;
use a machine learning-based classifier to determine that the identified client is exhibiting evasive network behavior, based on the obtained traffic telemetry data; and
initiate a mitigation action in the network, based on the determination that the identified client is exhibiting evasive network behavior.

11. The apparatus as in claim 10, wherein the mitigation action comprises one of:
blocking network traffic associated with the client or sending an alert regarding the evasive network behavior to a user interface.

12. The apparatus as in claim 10, wherein identifying the client in the network comprises:
receiving a notification from the firewall that the traffic flow associated with the client was blocked by the firewall.

13. The apparatus as in claim 10, wherein the traffic telemetry data is indicative of a change of destination addresses or ports of the one or more subsequent traffic flows from that of the blocked flow.

14. The apparatus as in claim 10, wherein process when executed is further configured to:
train the machine learning-based classifier using a training dataset comprising telemetry data regarding traffic flows generated by malware.

15. The apparatus as in claim 10, wherein the traffic telemetry data is indicative of a change of traffic protocol of the one or more subsequent traffic flows from that of the blocked flow.

16. The apparatus as in claim 15, wherein the traffic telemetry data is further indicative of a time span associated with the change of protocol.

17. The apparatus as in claim 15, wherein the traffic protocol of the one or more subsequent traffic flows is one of: the HyperText Transfer Protocol (HTTP), the HTTP Secure (HTTPS) protocol, the Secure Shell (SSH) protocol, or the Network Time Protocol (NTP).

18. The apparatus as in claim 15, wherein the traffic telemetry data is further indicative of a protocol field used by the one or more subsequent traffic flows.

19. A tangible, non-transitory, computer-readable medium storing program instructions that cause a traffic analysis service in a network to execute a process comprising:
identifying, by a traffic analysis service, a client in a network having an associated traffic flow that was blocked by a firewall;
obtaining, by the traffic analysis service, traffic telemetry data regarding one or more subsequent traffic flows associated with the identified client that are subsequent to the blocked flow;
using, by the traffic analysis service, a machine learning-based classifier to determine that the identified client is exhibiting evasive network behavior, based on the obtained traffic telemetry data; and
initiating, by the traffic analysis service, a mitigation action in the network, based on the determination that the identified client is exhibiting evasive network behavior.

20. The computer-readable medium as in claim 19, wherein the traffic telemetry data is indicative of a change of traffic protocol of the one or more subsequent traffic flows from that of the blocked flow.

* * * * *

UNITED STATES PATENT AND TRADEMARK OFFICE
CERTIFICATE OF CORRECTION

PATENT NO. : 11,310,205 B2
APPLICATION NO. : 16/288628
DATED : April 19, 2022
INVENTOR(S) : Constantinos Kleopa It is certified that error appears in the above-identified patent and that said Letters Patent is hereby corrected as shown below:

In the Specification

Column 3, Line 24, amend as shown:
link, with potentially a backup link (e.g., a 3G/4G/LTE backup Column 9, Line 42, amend as shown:
traffic encrypted in HTTPS, as soon as it starts, in an Column 10, Line 57, amend as shown:
blocked flow 410, the machine learning-based classifier may Signed and Sealed this
Twelfth Day of July, 2022

Katherine Kelly Vidal
*Director of the United States Patent and Trademark Office*